Oct. 13, 1931.  B. V. KORVIN-KROUKOVSKY  1,827,242
LANDING GEAR
Filed June 6, 1930  6 Sheets-Sheet 1
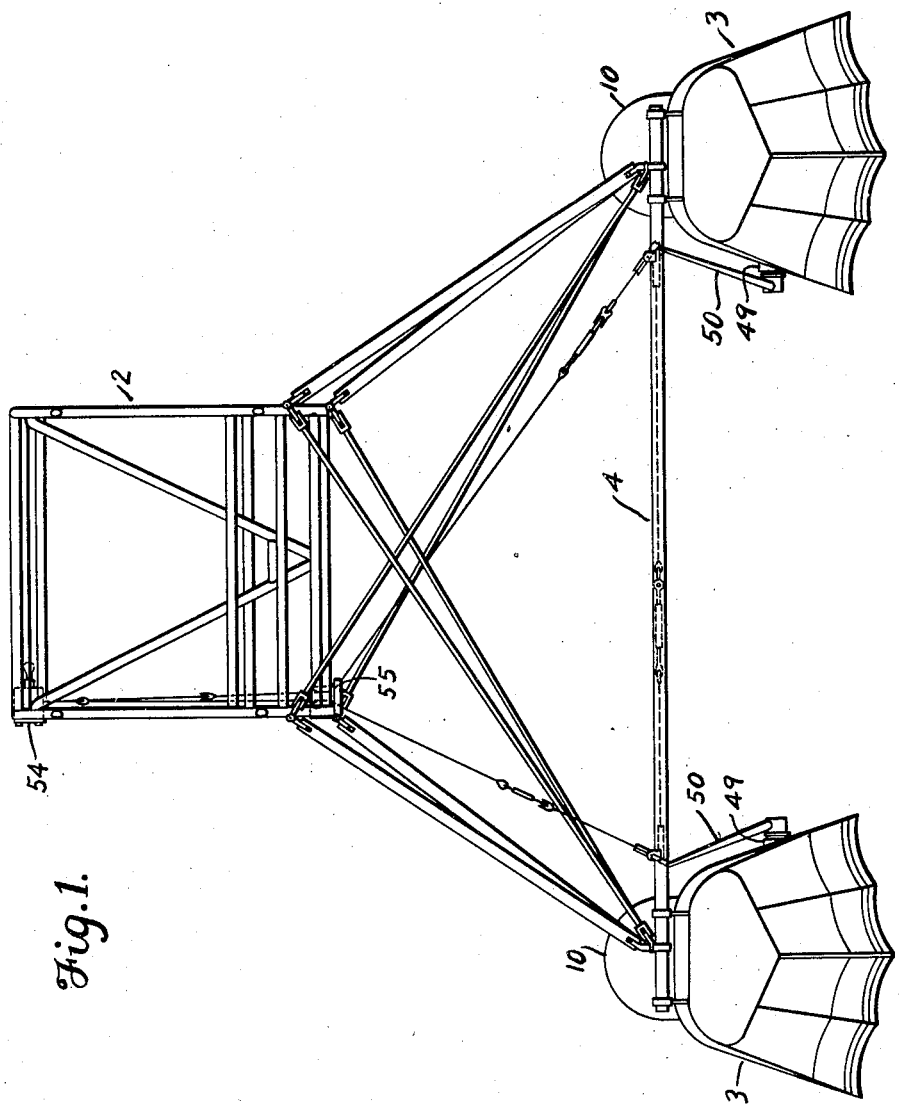

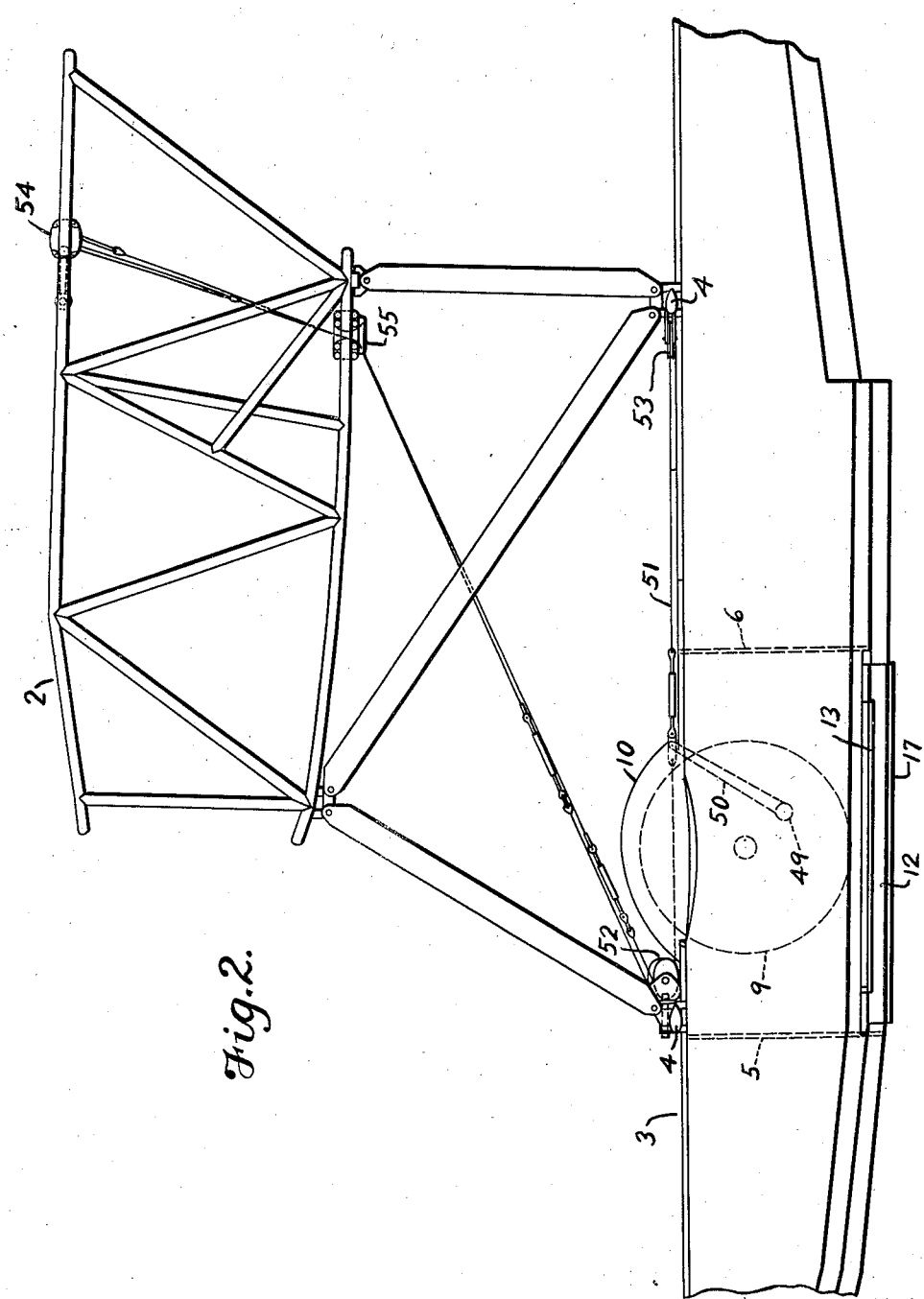

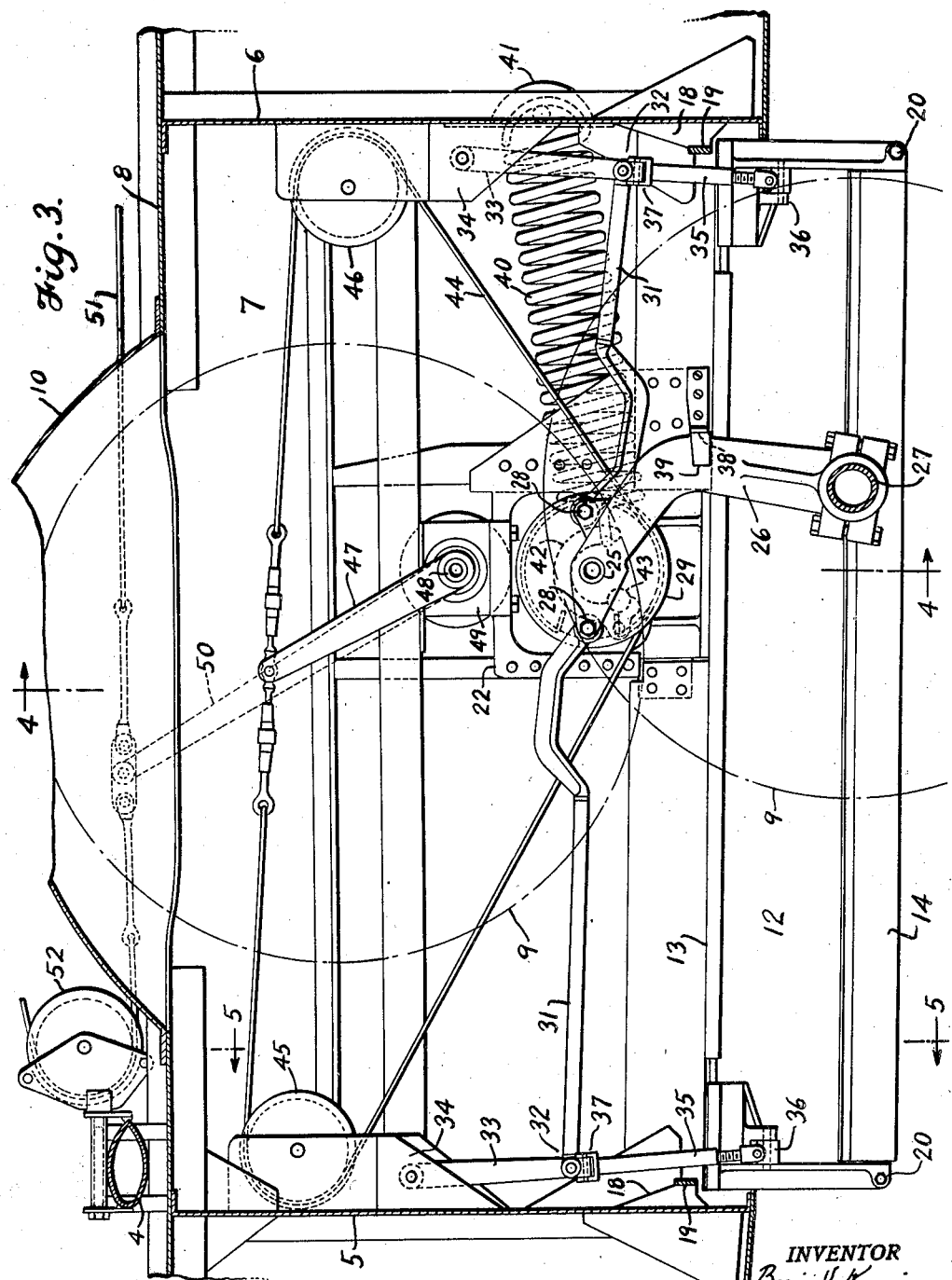

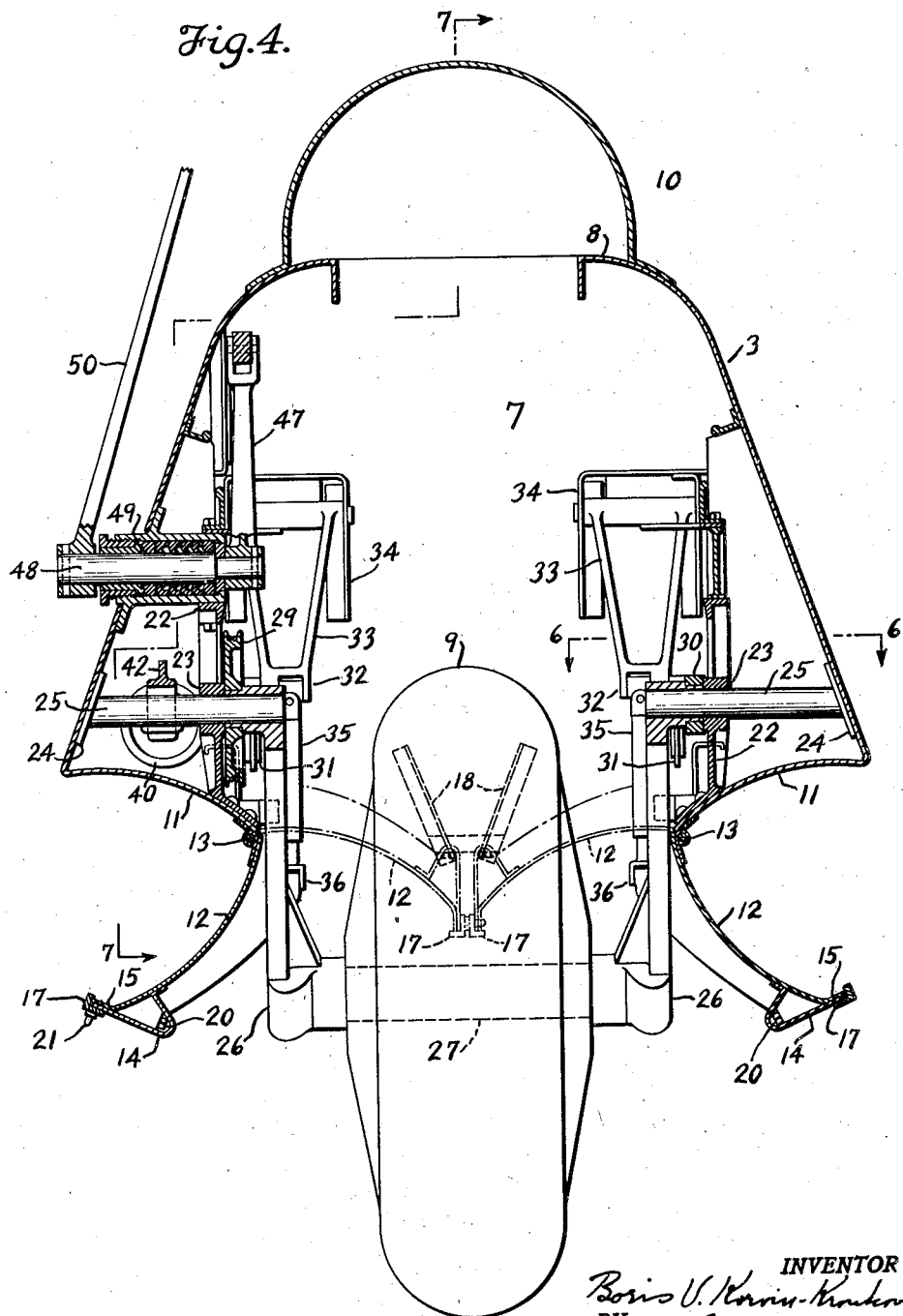

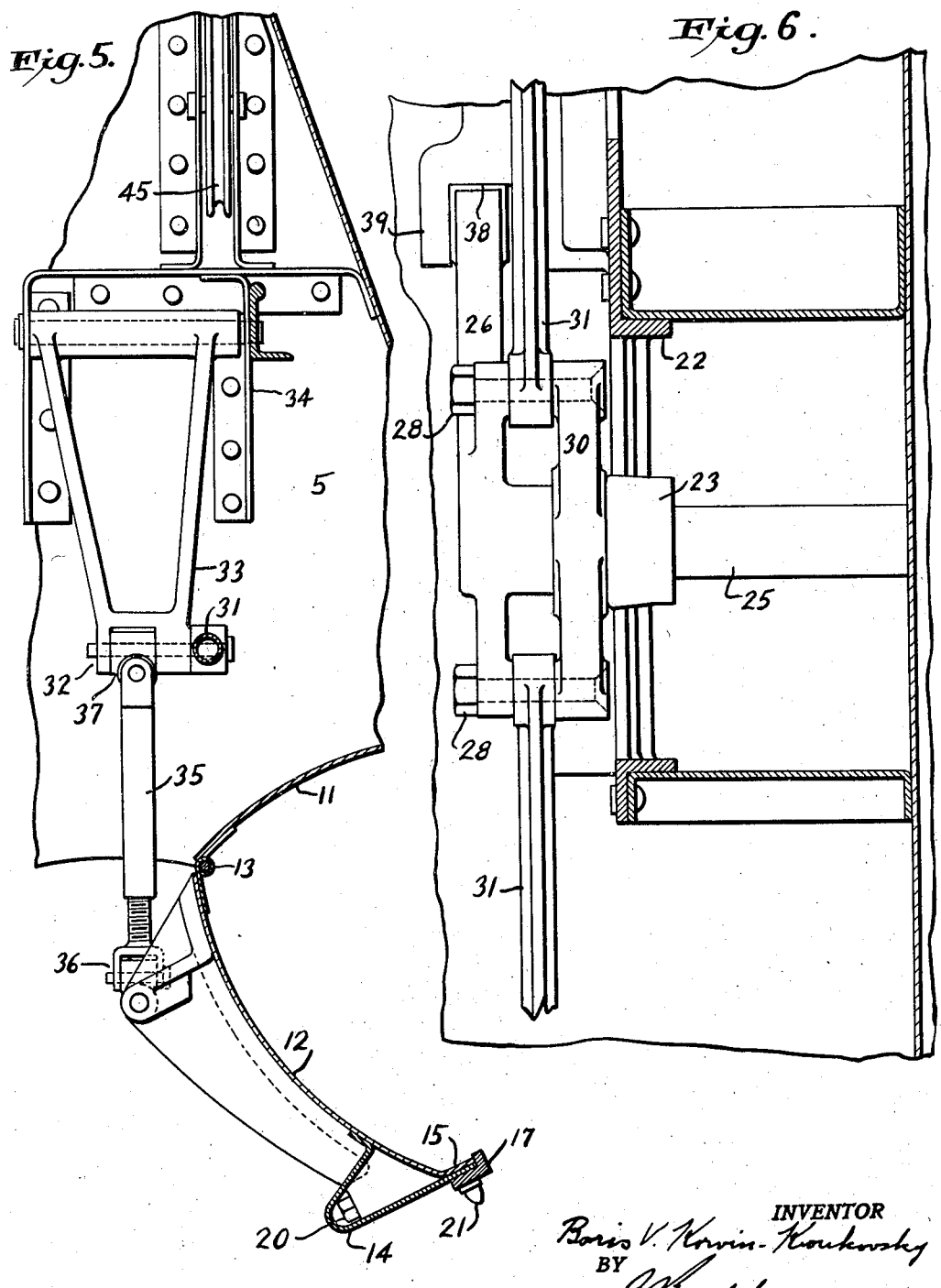

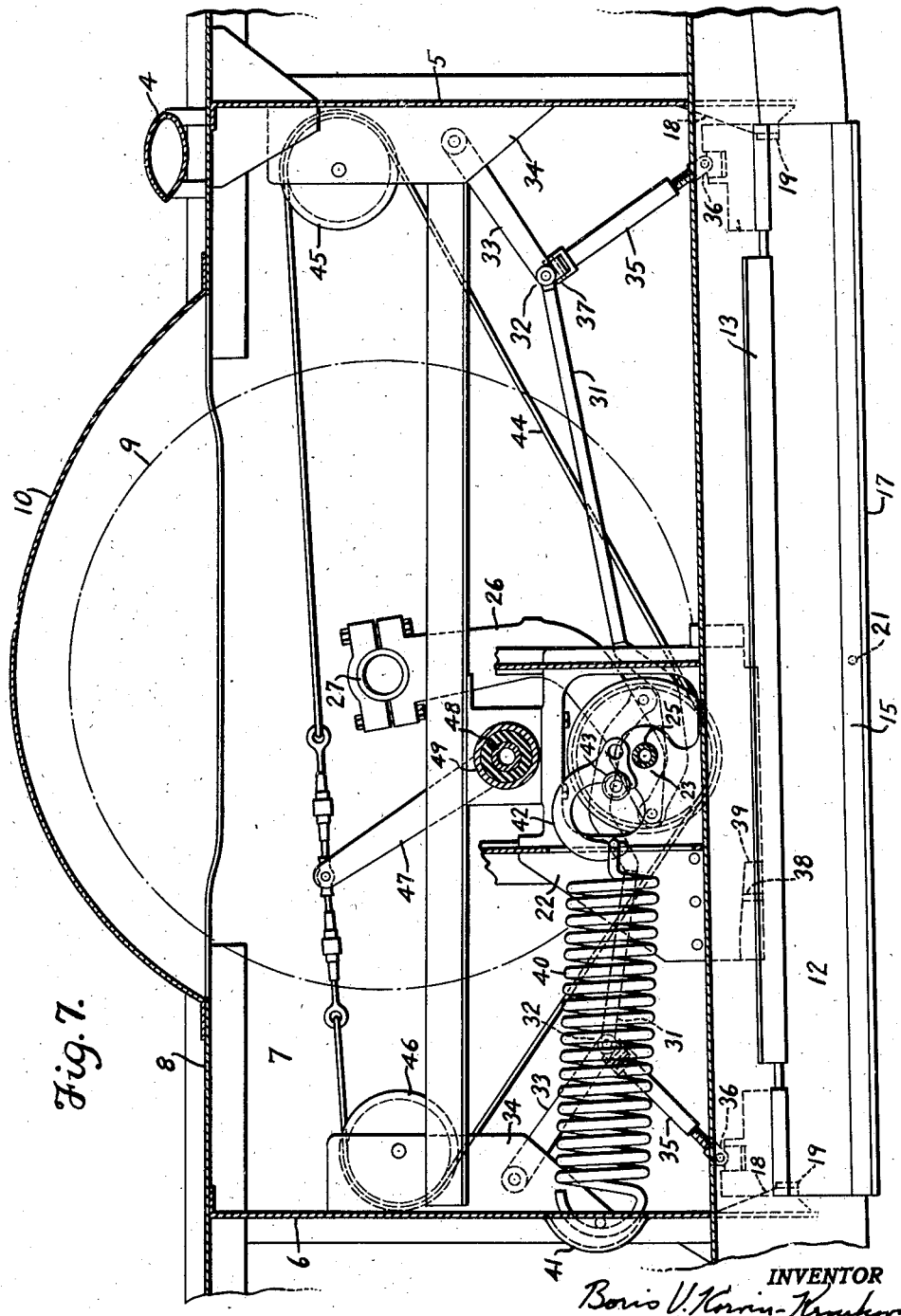

Patented Oct. 13, 1931

1,827,242

UNITED STATES PATENT OFFICE

BORIS V. KORVIN-KROUKOVSKY, OF BEECHHURST, NEW YORK, ASSIGNOR TO EDO AIRCRAFT CORPORATION, OF COLLEGE POINT, LONG ISLAND, N. Y.

LANDING-GEAR

Application filed June 6, 1930. Serial No. 459,513.

The invention relates to retractable landing-gears for heavier-than-air flying machines, and more particularly, though not necessarily exclusively, to amphibian gears including floats enabling the machine to alight on and rise from either water or land.

An object of the invention is to provide a float of the type containing a landing-gear which can be projected and retracted through the bottom of the float, and wherein the landing-gear is wholly carried by the float, independent of the body or other structure of the airplane, and is housed in an internal chamber of the float constructed in such manner as to constitute an air-tight bell, the air in which is solely relied upon to hold back the water which would otherwise be permitted to rise through the bottom of the chamber. The bottom of this chamber is preferably closed by hinged sections of the planing bottom of the float, which are opened and closed with the projection and retraction of the wheel, after the manner of doors, but which permit water to pass between and around them. In this way the landing-gear chamber is made to contribute to the buoyancy of the float, and the seaplane is enabled to leave the water easily. A certain comparatively small amount of water will enter the lower part of the chamber, depending upon the extent to which the float is submerged and limited by the restricted volume of compressible air in the chamber, but this water finds free egress as the float rises in taking off from a body of water.

Another object of the invention is to provide an advantageous toggle linkage for opening and closing the doors in connection with the operation of the landing-gear.

Another object of the invention is to provide a landing-gear mechanism of the type comprising a wheel-carrier which swings downward and rearward about a transverse center, wherein a counterbalance spring comes into action to raise the gear, but when the gear is projected serves to hold the gear against a stop which sustains the gear in the projected condition against the stresses of landing. Another object is to cause this spring to exert its influence on both the landing-gear and the doors.

Another object is to provide light and effective keel stiffening for the doors, so that these doors, when closed, are of adequate strength to serve as parts of the V-bottom of the float adjoining the keel line. The ends of the doors bear against fixed stops in the chamber, and provision is made for interengagement between the keel edges of the doors intermediate their ends, so that the doors mutually brace each other without necessarily coming into close contact.

Other objects and features of the invention will become apparent as the specification proceeds.

In the accompanying drawings:

Fig. 1 is a front elevation of the framework of the fuselage of an airplane to which are connected a pair of the landing-gear floats, the floats being shown in the condition with the landing gears retracted and the bottom doors closed;

Fig. 2 is a side elevation, showing the float in the same condition, and only a portion of the framework of the fuselage being illustrated;

Fig. 3 is a central vertical longitudinal section through the landing-gear chamber of one of the floats, showing the doors open and the landing-gear projected, the broken line circles showing the lowered and raised portions of the wheel;

Fig. 4 is a vertical transverse section taken on the offset line 4—4 of Fig. 3, broken lines being used to show the closed positions of the doors;

Fig. 5 is a fragmentary vertical transverse section taken on the line 5—5 of Fig. 3;

Fig. 6 is a fragmentary horizontal section taken on the line 6—6 of Fig. 4; and

Fig. 7 is a vertical longitudinal section taken on the line 7—7 of Fig. 4, showing the wheel raised and the doors closed.

In Figs. 1 and 2, the body or fuselage of a plane is designated 2, and 3 are twin floats connected with the body by suitable struts, braces and wires. The floats are cross-connected by spacers 4, and are adapted to be attached as a complete amphibian gear to airplanes of various makes. A suitable control for the wheel gears runs to the body of the airplane, but the landing-gear itself is carried wholly by the floats.

Each float has two transverse air-tight bulkheads 5, 6, which form the front and rear walls of a landing-gear chamber 7, dividing this chamber from the main buoyancy compartments in front and in rear. The longitudinal sides of this landing-gear chamber are formed by the air and water-tight outer walls of the float, and the air-tight top 8 of the float which joins these walls forms the top of the chamber. However, to accommodate the wheel 9 in its raised or retracted position, in which it is completely housed in the float, a large opening is cut in the top plate and this opening is closed in an air-tight manner by a dome 10.

The bottom of the landing-gear chamber has two fixed lateral sections 11 of the V-bottom of the float. Between these sections there is an opening through which the wheel can be lowered and raised, and this opening is closable, but not tightly, by two doors 12, which are connected at their outer lateral edges with the inner edges of the fixed bottom sections, by hinges 13. These doors when raised to the closed position constitute sections of the planing bottom of the float disposed in proximity to each other at each side of the keel line, forming the central lower part of the V-bottom for this part of the float.

The landing-gear chamber constitutes in effect a bell isolated from the other buoyancy compartments of the float, this bell being air-tight at all sides and at the top, but not water-tight at the bottom, water being permitted to enter between and around the closed doors to the slight extent which results from compression of the air in the bell or from escape of a minor amount of air through the bottom when the seaplane is traveling on a body of water or proceeding to take off. As the float rises such liquid as gained entrance to the lower part of the chamber is equally free to pass out. The landing-gear chamber is thus utilized, very nearly to the extent of its cubical capacity, to add its buoyancy to the buoyancy of the remainder of the float, and since the air in the float is solely relied upon to keep back the water the extreme difficulty which would be encountered in attempting to make the doors water-tight is avoided. Floats in which the landing-gear is disposed in wells open at the top and in which the water stands at the level of the surrounding body of water hinder an amphibian machine in taking off.

Each of the doors is provided at its inner edge with an internal keel member 14. A very advantageous construction for this keel member is obtained by bending a strip of metal into approximately V-form. The edge 15 of the door plate is bent downward and the longer limb of the keel member is secured to this edge, whereas the foot of the shorter limb is secured to the inner face of the door plate at a distance from the edge. These members afford a very strong yet light keel stiffening for the doors.

Further stiffening is secured by narrow keel bars 17, which are applied to the inner sides of the long limbs of the internal keel members 14. The three thicknesses at the keel edge of each door, consisting of the keel bar, the limb of the internal keel member and the edge portion of the keel plate, are firmly secured together by riveting or otherwise. The keel bar extends downward below the edges of the door plate and of the internal keel member and is preferably provided with a heavy bottom flange which extends outward under these edges for further external protection.

Brackets 18 are fixed to the inner faces of the bulkheads 5, 6 near the bottom, and carry fixed stops 19 in positions to be abutted by projections 20 on the ends of the doors when the latter are closed. In this position the narrow keel bars 17 are in proximity to each other but are not forced together, it being desirable in fact that there be an exit for water to escape from the landing-gear chamber at this, its lowest region.

A means of interengagement is provided, however, between the keel edges of the doors, this means taking the form of a pin 21 projecting inward from one of the keel bars 17 to enter a hole in the other keel bar. This interengagement causes the doors to brace each other in the closed position. The narrowness of the opposed keel bars 17 and the localized contact between the projections 20 and the door stops 19 enable the doors to overcome the resistance of mud or other foreign materials when they are brought to their closed positions.

Inside the landing-gear chamber, adjacent the sides, two main supporting brackets 22 are fixed, each of these brackets framing a suitable opening to allow for the action of moving parts and each having a hub-boss 23. These hub-bosses, together with sockets 24 on the side walls, hold two stationary axles 25, these spaced axles being in alinement transversely of the float. On these axles are swung wheel-carrying arms 26, the extremities of which are joined by the wheel axle 27.

United with the pivotal end of one of the wheel arms by bolts 28 is a drum 29, and united in a similar position with the other wheel arm, by bolts bearing the same reference numeral, is a plate 30.

A pair of links 31 are pivoted on the bolts 28 between the wheel arm and the drum, and another pair of links similarly designated are pivoted on the bolts 28 between the other wheel arm and the plate 30. The links of each pair extend toward the opposite ends of the landing-gear chamber and are connected with the central portions of door opening and closing toggles 32.

There are preferably four of these toggles connected in pairs with the opposite ends of the two doors, and as they are similar it will be sufficient to describe one of them. The toggle comprises an upper link 33 pivotally hung on a fixed bracket 34 on one of the bulkheads, and a lower link 35 which is connected by a universal joint 36 with the door. The proximate ends of the two links are connected by a universal joint 37, these two universal joints enabling the links 35 to swing transversely with the motion of the doors as well as to fold and straighten lengthwise of the float chamber.

When the arms 26 are swung in the direction to project the wheel below the float, the links 31 are thrust in opposite directions, straightening the toggles 32 to open the doors 12 downwardly and away from each other, and when the wheel is raised the links 31 are drawn away from the bulkheads 5, 6 so as to fold the toggles and swing the doors up to their closed positions.

The arc of movement of the wheel is in a vertical longitudinal plane. From its raised position the wheel is swung downward and then rearward until the arms 26 abut fixed stops 38 on the brackets 22, which stops prevent further movement and sustain the landing gear against upward and rearward stresses. In this position the center of the wheel is in rear of a perpendicular dropped from the fixed center support about which the arms swing, so that upward reaction, when the wheel is in contact with the ground, has no effect to return the wheel to raised position. The stops 38 have fingers 39 which project forward over the sides of the arms 26 in this position, the arms being confined in notches between these fingers and the brackets 22, with the result that the wheel carrier is rigidly sustained against side thrust.

A retracting or counterbalance spring 40 is anchored at one end to a fitting 41, which is let into the bulkhead 6 but without affecting the air-tightness of this bulkhead, and at the other end it is connected to a link 42 which is hooked or pivotally connected to a pin 43 projecting from the drum 29. The relation between the points of connection for the fixed and movable ends of this spring is such that as the wheel carrier arms 26 approach the stops 38 in the lowering of the wheel, the spring is carried past a position of maximum tension. Consequently, the spring then acts to draw the arms 26 against the stops 38, thereby in effect locking the landing-gear in its projected condition. At the same time the spring acts through the links 31 to insure movement of the toggles 32 to the positions which they finally occupy with the doors fully open. One toggle of each pair is then preferably flexed slightly past center, locking the doors open.

When the arms 26 are swung away from the stops 38 in the retracting operation, the spring 40 is again carried past its position of maximum tension, and thereafter the spring lifts the wheel and wheel carrier and the doors, overbalancing the weight of these parts. When the wheel carrier and the doors have been raised as far as they will go, these interconnecting parts are held in the retracted condition by the inital tension of the spring.

The ends of a cable 44 are fastened to the drum 29, the leads of this cable passing around guide pulleys 45, 46 mounted on the upper portions of the bulkheads 5, 6 and being connected to the end of an arm 47 at the inner side of one of the side walls of the float chamber. This arm is on a rotary shaft 48 which passes through an air-tight stuffing-box 49 which is secured in an opening in this wall. On the other end of this shaft, outside the float, there is a control arm 50.

An external control cable 51 is connected to this arm and passes in opposite directions about forward and rearward guide pulleys 52 and 53 on the top of the float, the forward pulleys being swiveled. From the rear pulley 53 the cable passes across to a corresponding pulley on the other float, thence to the external control arm 50 of the other float, thence around the forward pulley 52 of this float, thence upward and rearward to and through a guide 55 in the bottom of the body of the plane, to a crank-operated drum or sprocket device 54. From this device the cable passes downward through the guide 55, thence forward to the pulley 52 of the first float and thence to the arm 50 of that float. With this particular arrangement, the control arms 50 of the two floats are operated in reverse directions with respect to each other; hence these arms are set at different angles, and in order that the mechanisms of the floats be operated in the same sense the cable 44 in the two landing gear chambers should be wrapped on the drums 29 in reverse directions with respect to each other.

While a cable control is preferred, other forms of control, as for example hydraulic controls, may be employed. In any event, the connection between the external control and the landing-gear within the float is to be carried through the wall of the landing-gear chamber with a tight joint so as to preserve the air-tightness of the bell.

The operation of the mechanism has been sufficiently explained in connection with the description of the parts and need not be repeated. Mention may be made, however, of the advantageous nature of the toggle linkage for opening and closing the bottom doors in conjunction with the projection and retraction of the wheel-carrier. The toggles 32 are folded when the doors are closed and the wheels are raised, and when the wheel is moved downward the opening movement of the doors is most rapid at the beginning and becomes slower as the wheel approaches the landing position; consequently the doors are moved promptly out of the way of the wheel. Conversely, the inward movement of the doors as the wheel is raised is slow in the beginning and becomes more rapid as the wheel is withdrawn into the chamber.

While the preferred embodiment of the invention has been described in detail, it will be understood that numerous changes may be made and specifically different applications of features herein exemplified may be devised without departing from the scope of the invention set forth in the claims.

I claim:

1. A landing-gear float for airplanes, containing an internal wheel chamber isolated from the principal buoyancy compartments of the float, and a wheel housed in said chamber with means for projecting and retracting said wheel through the bottom of the float, said chamber being constructed as an air-tight bell.

2. A landing-gear float for airplanes, containing an internal wheel chamber isolated from the principal buoyancy compartments of the float, a wheel housed in said chamber with means for projecting and retracting said wheel through the bottom of the float, and a part of the planing bottom of the float which is hinged to open and which when disposed across the bottom of said chamber is adapted to permit water to pass freely, said chamber being constructed as an air-tight bell, the air in which is solely relied upon to hold back the water which would otherwise be free to rise around said bottom part.

3. A landing-gear float for airplanes, containing an internal wheel chamber isolated from the principal buoyancy compartments of the float, a landing-gear carried by the float and comprising a wheel and a wheel-carrier housed in said chamber so as to be projected and retracted through the bottom of the float, said chamber being constructed as an air-tight bell, and means for operating said landing-gear from a point outside the float, there being an air-tight joint where the operating means penetrates the air-confining enclosure of said bell.

4. A landing-gear float for airplanes, containing an internal wheel chamber isolated from the principal buoyancy compartments of the float, a landing-gear wholly carried by the float and comprising a wheel and a swinging wheel carrier housed in said chamber so as to be projected and retracted through the bottom of the float, a stop likewise in said chamber to coact with said wheel carrier to sustain the same in landing, and a part of the planing bottom of the float which is hinged to open and which when disposed across the bottom of the float is adapted to permit water to pass, said chamber being constructed as an air-tight bell, the air in which is solely relied upon to hold back the water which would otherwise be free to rise around said bottom part.

5. A landing-gear float for airplanes, containing an internal wheel chamber isolated from the principal buoyancy compartments of the float and constructed with air-tight walls on all sides and closing its top, a landing-gear wholly carried by the float and housed in said chamber so as to be projected and retracted through the bottom of the float, a stuffing-box secured in an opening in a side wall of said chamber, and a rotatable shaft passing through said stuffing-box, said shaft being connected interiorly of the chamber with the landing-gear and provided outside the float with an arm for connection with an external control.

6. A landing-gear float for airplanes containing main buoyancy compartments and an intermediate landing-gear chamber, tight bulkheads dividing said landing-gear chamber from the buoyancy compartments in front and rear, the tight side walls of the float forming the other sides of the chamber, said chamber having openings in its top and bottom, a dome tightly closing the upper of said openings, so that said chamber constitutes an air-tight bell, hinged sections of the planing bottom of the float closing the lower opening of said chamber in a manner to permit free passage of water, a landing-gear housed in said chamber to be projected downward through said lower opening, and an air-tight connection between said landing-gear and an external control.

7. In a landing-gear float containing a landing-gear chamber, the combination of a landing-gear in said chamber to be projected and retracted through the bottom of the float, rotatable parts connected with said landing-gear, hinged sections of the planing bottom of the float disposed across the bottom of said chamber, toggles comprising links connected with said bottom sections and links connected with the fixed structure of the float, and links connecting said toggles with said rotatable parts.

8. In a landing-gear float containing a landing-gear chamber, the combination of a landing-gear in said chamber to be projected and retracted through the bottom of the float, rotatable parts connected with said landing-gear, hinged sections of the planing bottom of the float disposed across the bottom of said chamber, toggles comprising upper links pivoted to the fixed structure of the float, lower links, and universal joints connecting said links with each other and the lower links with said hinged bottom sections, and links connecting said toggles with said rotatable members.

9. In a landing-gear float containing a landing-gear chamber, the combination of a landing-gear in said chamber comprising a wheel carrier movable about a transverse center to project and retract the wheel through the bottom of the float, a bottom door for said chamber, a toggle comprising links one of which is connected to the door and the other to the fixed structure of the float, and a connection between said toggle and the landing-gear.

10. In a landing-gear float containing a landing-gear chamber, the combination of a landing-gear in said chamber, a bottom door for said chamber, and a linkage connected with said door for operating the same in conjunction with the operation of the landing-gear, said linkage being pivoted at one end on the fixed structure of the float to exert downward thrust and upward pull on the door, and having an operating link connected with the landing-gear.

11. In a landing-gear for airplanes, a transverse center support, a wheel carrier mounted to swing in a vertical longitudinal plane about said support to project the wheel downward and rearward and to retract it forward and upward, a stop for bracing the wheel carrier in the projected position with the center of the wheel rearward of said transverse center support, and a spring connected with said carrier in such manner as to be carried past a position of maximum tension as the wheel carrier is moved to and away from said stop.

12. In a landing-gear float containing a landing-gear chamber, bottom doors for said chamber, a transverse center support in said chamber, a wheel carrier mounted to swing in a vertical longitudinal plane about said center support to project the wheel downward and rearward and to retract it forward and upward, a stop for bracing the wheel carrier in the projected position with the center of the wheel rearward of said center support, linkage interconnecting said doors with said carrier for operating the doors in both directions, and a spring connected with said wheel carrier and said door linkage so as to be carried past a position of maximum tension as the carrier is moved to and away from said stop.

13. In a landing-gear float for airplanes containing a landing-gear chamber, bottom doors for said chamber, a landing-gear in said chamber, linkage interconnecting said doors with said landing-gear, and a spring acting on said landing-gear and said linkage and arranged to be carried past a position of maximum tension as the landing gear is moved to fully projected position and again when the landing-gear is moved away from said position.

14. In a landing-gear for airplanes, a transverse center support, a wheel carrier mounted to swing in a vertical longitudinal plane about said support to project the wheel downward and rearward and to retract it upward and forward, a stop to brace said wheel carrier in projected position with the center of the wheel rearward of said center support, and a spring connected with said wheel carrier and arranged to be carried past a position of maximum tension as the wheel carrier is moved to and away from said stop.

15. In a landing-gear float for airplanes containing a landing-gear chamber, two plates forming parts of the planing bottom of the float hinged at their outer longitudinal edges so as to open downward after the manner of doors, internal keel members applied to the proximate portions of said bottom plates, said keel members consisting of strips of metal bent to an approximate V-section with the ends of their limbs united to the edges of said plates and to their inner faces at a distance from said edges respectively, and keel bars likewise united with the edges of the plates and extending beneath the same.

16. In a landing-gear float for airplanes containing a landing-gear chamber, two outwardly hinged doors for said chamber forming part of a V-bottom of the float, stops in said chamber positioned to receive upward thrust from the ends of said doors when closed, and means of interengagement between the keel edges of said doors intermediate their ends comprising a pin projecting from one of the keel edges to enter an opening in the other keel edge.

BORIS V. KORVIN-KROUKOVSKY.